(12) United States Patent
Nagasawa

(10) Patent No.: US 12,472,896 B2
(45) Date of Patent: Nov. 18, 2025

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 448 days.

(21) Appl. No.: 17/692,418

(22) Filed: Mar. 11, 2022

(65) Prior Publication Data
US 2022/0306026 A1 Sep. 29, 2022

(30) Foreign Application Priority Data

Mar. 29, 2021 (JP) .................................. 2021-054748

(51) Int. Cl.
*B60R 19/20* (2006.01)
*B60R 21/0134* (2006.01)
(Continued)

(52) U.S. Cl.
CPC ........ *B60R 19/205* (2013.01); *B60R 21/0134* (2013.01); *B60R 21/2338* (2013.01);
(Continued)

(58) Field of Classification Search
CPC .............. B60R 19/205; B60R 21/0134; B60R 21/2338; B60R 21/36; B60R 2021/0004;
(Continued)

(56) References Cited

U.S. PATENT DOCUMENTS 6,106,038 A * 8/2000 Dreher ...................... B60T 7/22
293/118
6,923,483 B2 * 8/2005 Curry .................. B60R 21/2338
180/274
(Continued)

FOREIGN PATENT DOCUMENTS

DE     10121630 A1 * 11/2002  ........... B60R 19/205
DE     10345264 A1 *  5/2004  ......... B60R 21/2338
(Continued)

OTHER PUBLICATIONS

Japanese Office Action JPA No. 2021-054748 issued date Jan. 7, 2025.

*Primary Examiner* — Amy R Weisberg
*Assistant Examiner* — Denise Lynne Esquivel
(74) *Attorney, Agent, or Firm* — McGinn I.P.Law Group, PLLC

(57) ABSTRACT

An airbag apparatus includes an airbag configured to be deployed forward of a front of a vehicle body of a vehicle; a collision determiner configured to establish a pre-crash determination when a collision probability with a collision object is equal to or higher than a predetermined threshold; and an airbag deployment controller configured to, in response to the pre-crash determination, give to an inflator a command to supply deployment gas to the airbag and deploy the airbag. The airbag includes front air chambers provided in a front portion of the airbag and disposed in a vehicle width direction, a coupling member configured to couple front end portions of the front air chambers in the vehicle width direction, and a rear air chamber disposed between rear portions of the front air chambers and a front end portion of the vehicle body, and communicating with an inside of each front air chamber.

20 Claims, 3 Drawing Sheets

(51) Int. Cl.
    *B60R 21/2338*     (2011.01)
    *B60R 21/36*        (2011.01)
    *B60R 21/00*        (2006.01)
    *B60R 21/01*        (2006.01)

(52) U.S. Cl.
    CPC ...... B60R 21/36 (2013.01); *B60R 2021/0004* (2013.01); *B60R 2021/01013* (2013.01)

(58) Field of Classification Search
    CPC .......... B60R 2021/01013; B60R 2021/23324; B60R 2021/23384; B60R 21/0136
    USPC ......... 296/106, 134, 107; 180/274; 293/107, 293/106, 134, 110
    See application file for complete search history.

(56) References Cited

U.S. PATENT DOCUMENTS

| | | | | |
|---|---|---|---|---|
| 7,753,159 | B2* | 7/2010 | Kim | B60R 21/36 180/274 |
| 8,152,196 | B2* | 4/2012 | Choi | B60R 19/48 180/274 |
| 8,764,062 | B2* | 7/2014 | Chung | B60R 19/205 180/274 |
| 9,132,799 | B1* | 9/2015 | Choi | B60R 21/36 |
| 10,953,844 | B2* | 3/2021 | Farooq | B60R 21/36 |
| 11,619,645 | B2* | 4/2023 | Charles | G01P 1/07 116/200 |
| 12,043,192 | B2* | 7/2024 | Nagasawa | B60R 19/205 |
| 2003/0155750 | A1* | 8/2003 | Hu | B60R 21/013 280/730.1 |
| 2005/0065688 | A1* | 3/2005 | Rao | B60R 21/013 340/436 |
| 2005/0087998 | A1* | 4/2005 | Curry | B61F 19/04 293/107 |
| 2009/0102167 | A1 | 4/2009 | Kitte et al. | |
| 2012/0267183 | A1 | 10/2012 | Wilmot et al. | |
| 2013/0119681 | A1* | 5/2013 | Mendis | B60R 21/36 293/107 |
| 2022/0134981 | A1* | 5/2022 | Baccouche | B60R 19/205 293/107 |
| 2022/0134983 | A1* | 5/2022 | Chandrasekaran | B60R 19/34 293/133 |

FOREIGN PATENT DOCUMENTS

| | | | | |
|---|---|---|---|---|
| DE | 10 2005 012 719 A1 | | 9/2006 | |
| DE | 112006000159 T5 | * | 11/2007 | .......... B60R 19/205 |
| DE | 102008051565 B4 | * | 10/2019 | .......... B60R 19/205 |
| JP | 2007-216933 A | | 8/2007 | |
| JP | 2007-269169 A | | 10/2007 | |
| JP | 2009-101793 A | | 5/2009 | |
| JP | 2009-190605 A | | 8/2009 | |
| JP | 2009190606 A | * | 8/2009 | |
| JP | 2011051452 A | * | 3/2011 | |
| JP | 2012-229014 A | | 11/2012 | |
| JP | 2016-078762 A | | 5/2016 | |
| WO | WO-2018173514 A1 | * | 9/2018 | |
| WO | WO-2019088028 A1 | * | 5/2019 | ......... B60R 21/0136 |

* cited by examiner

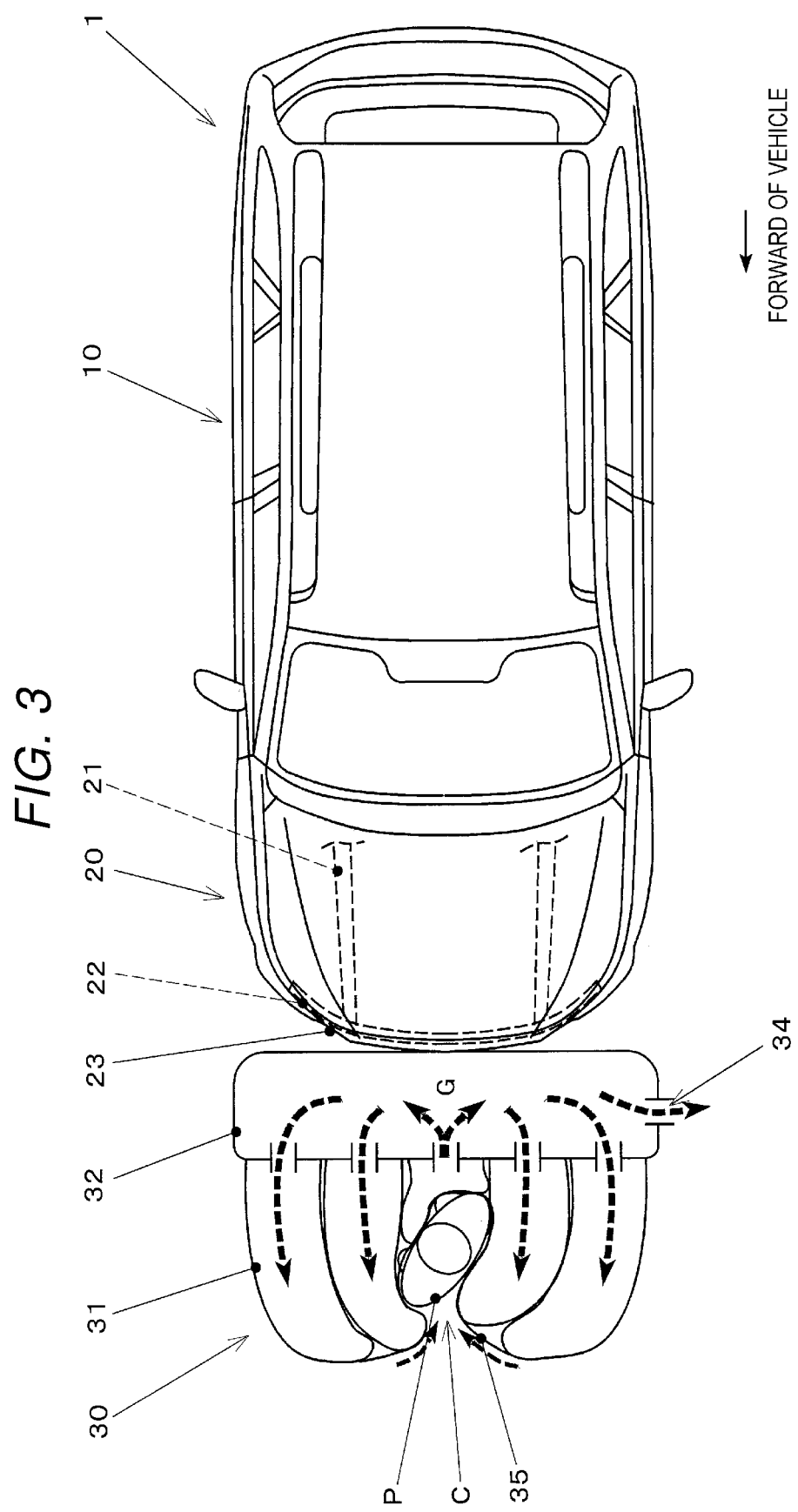

AIRBAG APPARATUS

CROSS-REFERENCE TO RELATED APPLICATIONS

The present application claims priority from Japanese Patent Application No. 2021-054748 filed on Mar. 29, 2021, the entire contents of which are hereby incorporated by reference.

BACKGROUND

The disclosure relates to an airbag apparatus including an airbag deployable outward from a vehicle body front of a vehicle such as an automobile.

Concerning a vehicle such as an automobile, to prevent injury to an occupant, a pedestrian, or the like during a collision, it has been widely known to use an airbag apparatus with a bag made of panels of base cloth that is deployed by a chemical (explosive) inflator.

Also, It has been proposed to use an airbag deployable outside the vehicle so as to prevent injury to a pedestrian or the like during a collision.

As a technique regarding such an external airbag apparatus, for example, Japanese Unexamined Patent Application Publication (JP-A) No. 2012-229014 discloses an airbag for pedestrian protection including a plurality of chambers (air chambers), which are coupled by a tether to induce tension at the time of deployment so as to influence the trajectory and the shape of the airbag.

JP-A No. 2009-190605 discloses an airbag for pedestrian protection deployable forward of a vehicle body. When the airbag is deployed, a plurality of longitudinal slits are formed at intervals in a vehicle width direction, and enlarged deep portions are formed at the bottom of the longitudinal slits, so that the longitudinal slits and the enlarged deep portions receive and restrain the legs of a pedestrian.

JP-A No. 2016-78762 discloses an airbag for pedestrian protection including a plurality of airbags that are expanded and deployed radially as viewed from an upper side of a vehicle when the vehicle collides with a pedestrian, so as to prevent the head of the pedestrian from being displaced outward in a vehicle width direction and falling down on a road surface.

SUMMARY

An aspect of the disclosure provides an airbag apparatus to be applied to a vehicle. The airbag apparatus includes an airbag, a collision determiner, and an airbag deployment controller. The airbag is configured to be deployed forward of a front of a vehicle body of the vehicle. The collision determiner is configured to establish a pre-crash determination in a case where a collision probability with a collision object is equal to or higher than a predetermined threshold. The airbag deployment controller is configured to, in response to the pre-crash determination, give to an inflator a command to supply deployment gas to the airbag and deploy the airbag. The airbag includes front air chambers, a coupling member, and a rear air chamber. The front air chambers are provided in a front portion of the airbag and disposed in a vehicle width direction. The coupling member is configured to couple front end portions of the front air chambers in the vehicle width direction. The rear air chamber is disposed between rear portions of the front air chambers and a front end portion of the vehicle body. The rear air chamber communicates with an inside of each of the front air chambers.

An aspect of the disclosure provides an airbag apparatus to be applied to a vehicle. The airbag apparatus includes an airbag and circuitry. The airbag is configured to be deployed forward of a front of a vehicle body of the vehicle. The circuitry is configured to establish a pre-crash determination in a case where a collision probability with a collision object is equal to or higher than a predetermined threshold. The circuitry is configured to, based on the pre-crash determination, give to an inflator a command to supply deployment gas to the airbag and deploy the airbag. The airbag includes front air chambers, a coupling member, and a rear air chamber. The front air chambers are provided in a front portion of the airbag and disposed in a vehicle width direction. The coupling member is configured to couple front end portions of the front air chambers in the vehicle width direction. The rear air chamber is disposed between rear portions of the front air chambers and a front end portion of the vehicle body. The rear air chamber communicates with an inside of each of the front air chambers.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 3 is a diagram schematically illustrating a state after a vehicle including the airbag apparatus according to the embodiment has collided with a pedestrian.

DETAILED DESCRIPTION

Concerning a collision of a vehicle with a pedestrian or a bicyclist (hereinafter referred to as a "pedestrian or the like"), there has been a demand for preventing injury to the pedestrian or the like.

Also, there has been a demand for preventing the pedestrian or the like that has received a reaction force from an airbag from being sent flying forward of the vehicle.

It is desirable to provide an airbag apparatus that can prevent injury to a pedestrian or the like.

Hereinafter, an airbag apparatus according to an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The airbag apparatus according to the embodiment is disposed, for example, on a front of a vehicle body of an automobile such as a passenger vehicle so as to mainly protect (reduce the injuriousness to) a human body of a pedestrian, a bicyclist, or the like, with whom the automobile has collided.

Figure 1:
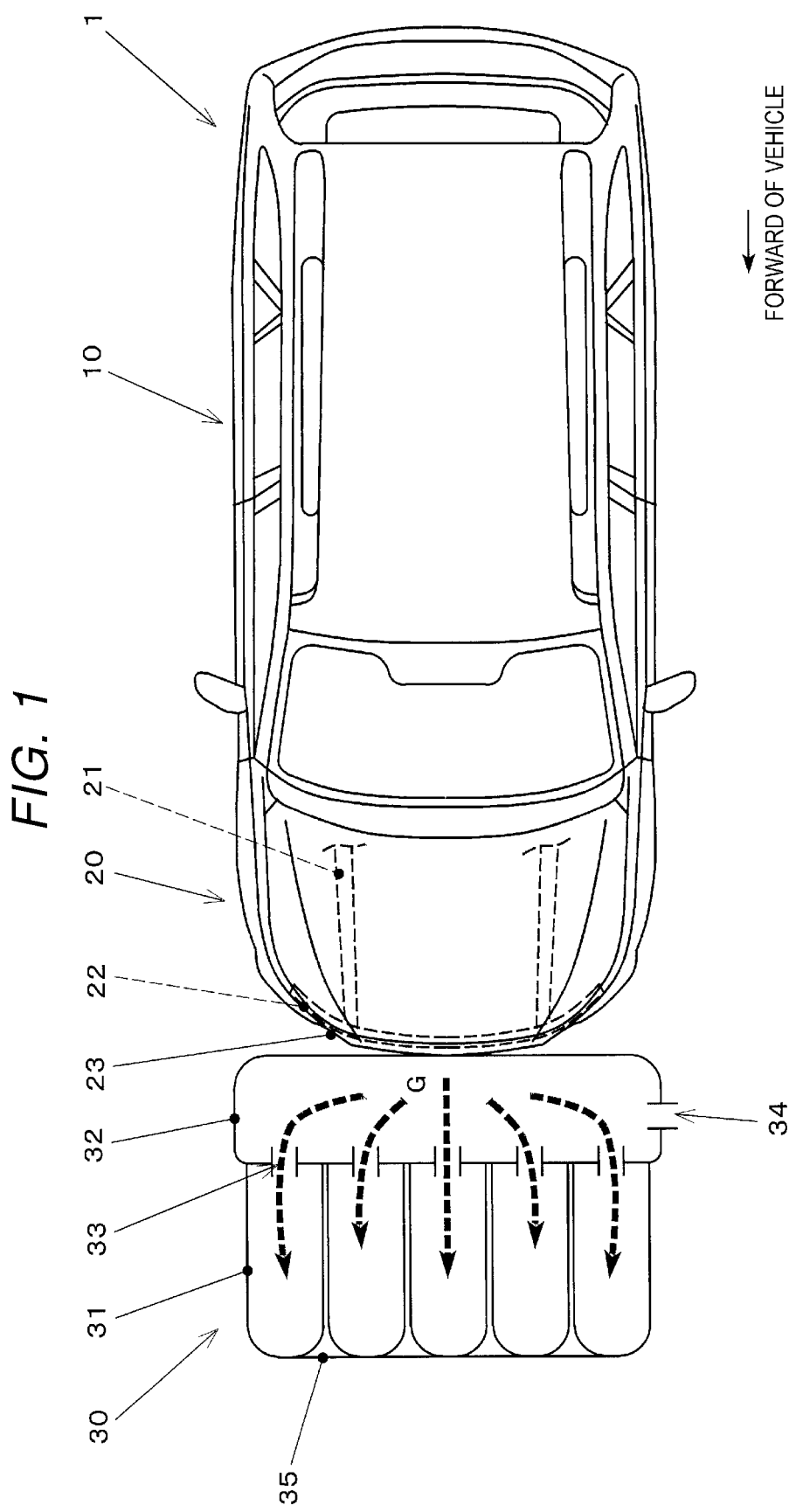
FIG. 1 is a diagram schematically illustrating a configuration of an airbag apparatus according to an embodiment of the disclosure.

FIG. 1 is a diagram schematically illustrating a configuration of the airbag apparatus according to the embodiment.

FIG. 1 illustrates a state of a vehicle including the airbag apparatus according to the embodiment, as viewed from above.

A vehicle 1 has, for example, a so-called two-box vehicle shape including an engine compartment 20 that protrudes forward from a vehicle cabin 10.

The vehicle cabin 10 has a space that accommodates an occupant, for example.

The engine compartment 20 has a space containing power train components such as an engine, a transmission, a motor-generator in the case of an electric vehicle, and control units for these components.

The engine compartment 20 includes front side frames 21, a bumper beam 22, a front bumper 23, and other components.

The front side frames 21 are structural members protruding toward the front of the vehicle from a toeboard (not illustrated), which is a partition wall disposed on a front end of the vehicle cabin 10.

The front side frames 21 serve, for example, as cross members where a power train and a front suspension are attached, and as a base portion where a component such as a strut housing containing struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shaped member of a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that an airbag 30 (described below) receives from a human body or object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets (not illustrated), for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The airbag apparatus according to the embodiment includes the airbag 30 described below.

The airbag 30 is formed in a bag shape by bonding panels of base cloth such as nylon 66 woven fabric.

When a pre-crash determination (described below) is established, deployment gas generated by an inflator 111 is introduced into the airbag 30, and the airbag 30 is deployed and further expanded.

The airbag 30 is deployed forward of the vehicle from a center portion of the front end of the vehicle body in the vehicle width direction.

In normal operation (before a pre-crash determination is established), the airbag 30 in a folded state is attached to the bumper beam 22 and contained inside the front bumper 23.

Upon a collision, the airbag 30 breaks a fragile portion of the front bumper 23 and is unfolded forward of the vehicle and deployed forward of the front surface of the front bumper 23.

The airbag 30 includes, for example, front air chambers 31, a rear air chamber 32, communication openings 33, a vent hole 34, and a coupling member 35.

The front air chambers 31 constitute a front half of the airbag 30. Each of the front air chambers 31 is made of panels of base cloth and has a bag shape with an open rear end.

The rear end of the front air chamber 31 is bonded to a front surface of the rear air chamber 32.

The front air chamber 31 is deployed from the front surface of the rear air chamber 32 and projects forward of the vehicle.

For example, five front air chambers 31 are arranged in the vehicle width direction.

The rear air chamber 32 is deployed between rear portions of the front air chambers 31 and a front end of the vehicle body (a front surface of the front bumper 23).

The rear air chamber 32 is made of panels of base cloth and has a bag shape extending in the vehicle width direction along the front surface of the front bumper 23.

The communication openings 33 are formed in the front surface of the rear air chamber 32 in such a manner that the inside of the rear air chamber 32 and the inside of the front air chambers 31 communicate with each other to allow the deployment gas G to flow.

The plurality of front air chambers 31 each have a rear portion where the communication opening 33 is formed.

The plurality of front air chambers 31 are mutually communicable via the communication openings 33 and the rear air chamber 32.

The vent hole 34 is formed in the rear air chamber 32 and is a vent passage through which the deployment gas is discharged from the rear air chamber 32.

The vent hole 34 may be provided as an opening from the beginning. Alternatively, the vent hole 34 may be closed until occurrence of a collision after the deployment, and subsequently, when the airbag 30 is pressed by the collision object, the vent hole 34 may be opened in response to an increase in the internal pressure of the airbag 30.

The coupling member 35 is made of a flexible material such as a panel of base cloth and a tether belt, and has a strap shape extending in the vehicle width direction to couple front end portions of the plurality of front air chambers 31.

As illustrated in FIG. 1, the coupling member 35 extends in the vehicle width direction when there is no collision after the deployment of the airbag 30.

At this time, one of surfaces of the coupling member 35 faces forward of the vehicle.

Upon a collision with the collision object such as a pedestrian or the like, when some of the front air chambers 31 is contracted, the coupling member 35 pulls front end portions of the rest of the front air chambers 31 toward the contracted front air chamber 31.

This will be described below in detail.

Figure 2:
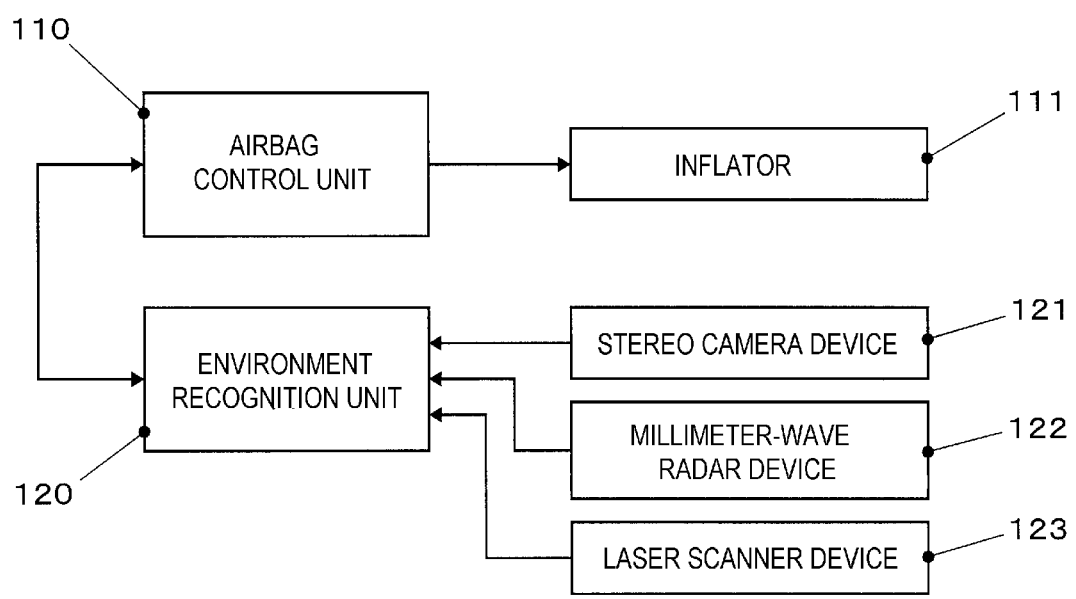
FIG. 2 is a block diagram schematically illustrating a configuration of a system to control the airbag apparatus according to the embodiment.

FIG. 2 is a block diagram schematically illustrating a configuration of a system to control the airbag apparatus according to the embodiment.

The system to control the airbag apparatus includes components such as an airbag control unit 110, and an environment recognition unit 120.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly, and are mutually communicable.

The airbag control unit 110 commands and controls the inflator 111 so as to deploy the airbag 30 and also to control a deployment state.

In one embodiment, the airbag control unit 110 may serve as an "airbag deployment controller".

The inflator 111 is a chemical (explosive) gas generation device to generate the deployment gas G to deploy the airbag 30 in response to a command from the airbag control unit 110.

The environment recognition unit 120 recognizes an environment around the host vehicle based on outputs from various sensors.

The environment recognition unit 120 recognizes, for example, human bodies of pedestrians, bicyclists, or the like, various objects such as other vehicles, buildings, trees, and geographical features, and road shapes (lane shapes) in the vicinity of the vehicle 1 (host vehicle).

When a collision with a human body of a pedestrian, a bicyclist, a motorcyclist, or the like, or with an object other than a human body, such as another vehicle, is unavoidable (when a collision probability is a predetermined value or higher), the environment recognition unit 120 establishes a pre-crash determination. In one embodiment, the environment recognition unit 120 may serve as a "collision determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and recognizes human bodies of pedestrians, bicyclists, or the like, and objects such as other vehicles and buildings. The stereo camera device 121 also detects a position of each of the human bodies, objects, or the like relative to the vehicle 1 using known stereo image processing.

The stereo camera device 121 recognizes attributes of a subject or an object by, for example, pattern recognition of a captured image.

For example, in the case of a human body of a pedestrian or the like, the stereo camera device 121 recognizes attributes such as a build, presumed weight, and posture of the human body.

The millimeter-wave radar device 122 uses radio waves in a frequency band of 30 to 300 GHz, for example, and detects presence of a human body, an object, or the like, and positions of the human body, the object, or the like relative to the vehicle 1.

The laser scanner device (LIDAR) 123 irradiates and scans the vehicle 1 and its vicinity with a near-infrared laser beam in a pulse shape, for example. Based on presence of reflected light and time lags until the reflected light returns, the laser scanner device 123 detects presence of a human body, an object, or the like, positions of the human body, the object, or the like relative to the vehicle 1, and shapes of the human body, the object, or the like.

A description will now be made on functions and effects of the airbag apparatus according to the embodiment during a collision.

When the environment recognition unit 120 establishes a pre-crash determination, the airbag control unit 110 gives the inflator 111 a command to generate the deployment gas G.

The inflator 111 introduces the deployment gas G into the rear air chamber 32 of the airbag 30 so as to deploy the airbag 30 into a state illustrated in FIG. 1 in advance of actual occurrence of the collision.

At this time, the deployment gas G is introduced into the front air chambers 31 via the rear air chamber 32 and the communication openings 33.

FIG. 3 is a diagram schematically illustrating a state after a vehicle including the airbag apparatus according to the embodiment has collided with a pedestrian.

In FIG. 3, an example of the collision object is a pedestrian P.

As illustrated in FIG. 3, for example, when the pedestrian P collides with a part of a front end portion of the airbag 30, the front air chamber 31 right behind the region is pressed by the pedestrian P and contracted in a fore-and-aft direction.

At this time, the deployment gas G in the contracted front air chamber 31 flows into the rear air chamber 32 via the communication opening 33 and is partly introduced into the rest of the front air chambers 31.

When some of the front air chambers 31 (a central one of the front air chambers 31 in an example illustrated in FIG. 3) is contracted, front end portions of the other front air chambers 31 on both sides of the contracted front air chamber 31 are pulled inward in the vehicle width direction and rearward of the vehicle by the coupling member 35.

In a front portion of the airbag 30, the coupling member 35 is partly recessed rearward of the vehicle so as to form a recessed portion C where the collision object (the pedestrian P in this case) is contained and restrained.

As the deployment gas G is additionally supplied, the front air chambers 31 other than the contracted front air chamber 31 are expanded and deformed to fall down in a direction to close the recessed portion C.

Thus, the pedestrian P contained in the recessed portion C is held by the left and right front air chambers 31 increased in internal pressure. At the same time, front end portions of these front air chambers 31 are pulled by the coupling member 35 and close an inlet of the recessed portion C, thereby firmly restraining the pedestrian P.

While the pedestrian P is restrained in the recessed portion C, and when the pedestrian P is displaced relative to the vehicle body and rearward of the vehicle, the rear air chamber 32 discharges the deployment gas G through the vent hole 34 and is contracted to absorb collision energy.

At this time, the pedestrian P is pressed forward and accelerated to be decreased in speed relative to the vehicle body. This prevents injury to the pedestrian P.

Moreover, restraint of the pedestrian P in the recessed portion C can prevent the pedestrian P from being released from the recessed portion C and thrown forward of the airbag 30 by a reaction force from the airbag 30 and deceleration of the vehicle 1.

As described above, according to this embodiment, restraint performance of the pedestrian P or the like by the airbag 30 can be improved to provide the airbag apparatus that can prevent injury to the pedestrian P or the like.

Modifications

The disclosure is not limited to the above-described embodiment but may be modified in various manners. Such modifications will also fall within the technical scope of the disclosure.

1. The configurations of the airbag apparatus and the vehicle are not limited to those of the above-described embodiment but may be appropriately modified.

For example, a configuration, shape, material, manufacturing method, location, and the number of components of each type constituting the airbag apparatus and the vehicle, and details of various types of control are not limited to those in the embodiment but may be appropriately modified.

2. A method of performing a pre-crash determination and a method of discriminating a collision mode are not limited to those in the above-described embodiment but may be appropriately modified.

3. The arrangement and the number of front air chambers and rear air chambers of the airbag according to the embodiment are an example, and may be appropriately changed.

For example, the number of front air chambers in the vehicle width direction may be appropriately increased or decreased. Groups of the plurality of front air chambers in the vehicle width direction may be stacked to form a plurality of layers in a vertical direction. In this case, the rear air chambers may be stacked to form a plurality of layers in the vertical direction that correspond to the respective layers of the front air chambers. In this case, an independent inflator, for example, may be provided to supply the deployment gas into the rear air chamber in each of the layers so as to make the internal pressure and deployment timing differ between the airbags in the different layers.

The airbag apparatus according to the embodiment of the disclosure includes the airbag, the collision determiner, and the airbag deployment controller. The airbag is configured to be deployed forward of a front of a vehicle body of a vehicle. The collision determiner is configured to establish a pre-crash determination when a collision probability with a collision object is equal to or higher than a predetermined threshold. The airbag deployment controller is configured to, in response to the pre-crash determination, give the inflator a command to supply deployment gas to the airbag and deploy the airbag. The airbag includes a plurality of front air chambers provided in a front portion of the airbag and disposed in a vehicle width direction. The coupling member is configured to couple front end portions of the plurality of front air chambers in the vehicle width direction. The rear air chamber is disposed between rear portions of the plurality of front air chambers and a front end portion of the vehicle body. The rear air chamber communicates with an inside of each of the plurality of front air chambers.

With this configuration, when the collision object (such as a human body of a pedestrian, a bicyclist, or the like) collides with a front end of the airbag, the deployment gas flows out of the front air chamber behind a collision position into the rear air chamber so as to contract the front air chamber and form the recessed portion where the coupling member is locally recessed rearward so that the collision object is contained in the recessed portion.

At this time, part of the deployment gas discharged from the contracted front air chamber is introduced into the front air chambers other than the contracted front air chamber via the rear air chamber. Consequently, the front air chambers are further expanded and pulled by the coupling member so that the front air chambers are deformed and fall down in a direction to close an inlet of the recessed portion.

Thus, the collision object in the recessed portion can be effectively restrained to perform energy absorption in a stable state. Moreover, the collision object can be prevented from being thrown forward of the airbag by a reaction force from the airbag and deceleration of the vehicle.

In the embodiment of the disclosure, the rear air chamber may include a vent passage configured to discharge deployment gas from the rear air chamber.

With this configuration, when the collision object restrained in the recessed portion is displaced in the direction to press the rear air chamber, the rear air chamber is contracted by discharging the deployment gas via the vent passage so that collision energy can be effectively absorbed.

As described above, according to the embodiment of the disclosure, it is possible to provide the airbag apparatus that can prevent injury to a pedestrian or the like.

The airbag control unit 110 and the environment recognition unit 120 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110 and the environment recognition unit 120 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110 and the environment recognition unit 120 illustrated in FIG. 2.

The invention claimed is:

1. An airbag apparatus to be applied to a vehicle, the airbag apparatus comprising:
   an airbag configured to be deployed forward of a front of a vehicle body of the vehicle;
   a collision determiner configured to establish a pre-crash determination in a case where a collision probability with a collision object is equal to or higher than a predetermined threshold; and
   an airbag deployment controller configured to, in response to the pre-crash determination, give to an inflator a command to supply deployment gas to the airbag and deploy the airbag, wherein the airbag comprises
front air chambers are bag-shaped and provided in a front portion of the airbag and arranged in line along a vehicle width direction,
a coupling member configured to couple front end portions of the front air chambers in the vehicle width direction and formed into a strap shape by a flexible material configured to provide restrictive movement of the front end portions of the front air chambers,
a rear air chamber is bag-shaped, different from the front air chambers, and disposed between rear portions of the front air chambers and a front end portion of the vehicle body, the rear air chamber communicating with an inside of each of the front air chambers, and
communication openings are openings formed in the rear surface of the front air chambers and the front surface of the rear air chamber in such a manner that the inside of the rear air chamber and the inside of the front air chambers communicate with each other,
wherein the front air chambers are deployed from the rear air chamber and project forward from the rear air chamber and the front end portion of the vehicle body.

2. The airbag apparatus according to claim 1, wherein the rear air chamber comprises a vent passage configured to discharge deployment gas from the rear air chamber, and
wherein when one of the first air chambers contract upon a collision, the coupling member is configured to pull the front end portions of a remainder of the front air chambers toward the contracted front air chamber.

3. An airbag apparatus to be applied to a vehicle, the airbag apparatus comprising:
an airbag configured to be deployed forward of a front of a vehicle body of the vehicle; and
circuitry configured to
establish a pre-crash determination in a case where a collision probability with a collision object is equal to or higher than a predetermined threshold, and
based on the pre-crash determination, give to an inflator a command to supply deployment gas to the airbag and deploy the airbag,
wherein the airbag comprises
front air chambers are bag-shaped and provided in a front portion of the airbag and arranged in line along a vehicle width direction,
a coupling member configured to couple front end portions of the front air chambers in the vehicle width direction and formed into a strap shape by a flexible material configured to provide restrictive movement of the front end portions of the front air chambers,
a rear air chamber is bag-shaped, different from the front air chambers, and disposed between rear portions of the front air chambers and a front end portion of the vehicle body, the rear air chamber communicating with an inside of each of the front air chambers, and
communication openings are openings formed in the rear surface of the front air chambers and the front surface of the rear air chamber in such a manner that the inside of the rear air chamber and the inside of the front air chambers communicate with each other,
wherein the front air chambers are deployed from the rear air chamber and project forward from the rear air chamber and the front end portion of the vehicle body.

4. The airbag apparatus according to claim 3, wherein the rear air chamber comprises a vent passage configured to discharge deployment gas from the rear air chamber.

5. A vehicle, comprising:
an airbag configured to be deployed forward of a front of a vehicle body of the vehicle;
a collision determiner configured to establish a pre-crash determination in a case where a collision probability with a collision object is equal to or higher than a predetermined threshold; and
a controller configured to, in response to the pre-crash determination, give to an inflator a command to supply deployment gas to the airbag and deploy the airbag,
wherein the airbag comprises
front air chambers are bag-shaped and provided in a front portion of the airbag and arranged in line along a vehicle width direction,
a coupling member comprising a recessed portion configured to couple front end portions of the front air chambers in the vehicle width direction to contain a collision object and formed into a strap shape by a flexible material configured to provide restrictive movement of the front end portions of the front air chambers,
a rear air chamber is bag-shaped, different from the front air chambers, and disposed between rear portions of the front air chambers and a front end portion of the vehicle body, the rear air chamber communicating with an inside of each of the front air chambers, and
communication openings are openings formed in the rear surface of the front air chambers and the front surface of the rear air chamber in such a manner that the inside of the rear air chamber and the inside of the front air chambers communicate with each other,
wherein the front air chambers are deployed from the rear air chamber and project forward from the rear air chamber and the front end portion of the vehicle body.

6. The vehicle according to claim 5, wherein the rear air chamber comprises a vent passage configured to discharge deployment gas from the rear air chamber.

7. The airbag apparatus according to claim 1, wherein the front air chambers include a first front air chamber and second front air chambers on both sides of the first front air chamber,
the coupling member is configured to pull the front end of the second front air chambers toward the first front air chamber when the first front air chamber contracts while the front air chambers are deployed.

8. The airbag apparatus according to claim 3, wherein the front air chambers include a first front air chamber and second front air chambers on both sides of the first front air chamber,
the coupling member is configured to pull the front end of the second front air chambers toward the first front air chamber when the first front air chamber contracts while the front air chambers are deployed.

9. The vehicle according to claim 5, wherein the front air chambers include a first front air chamber and second front air chambers on both sides of the first front air chamber,
the coupling member is configured to pull the front end of the second front air chambers toward the first front air chamber when the first front air chamber contracts while the front air chambers are deployed.

10. The airbag apparatus according to claim 1, wherein in the front portion of the airbag, the coupling member is partly recessed rearward of the vehicle so as to form a recessed portion where the collision object is contained and restrained.

11. The airbag apparatus according to claim 1, wherein the coupling member is partly recessed rearward of the vehicle so as to form a recessed portion.

12. The airbag apparatus according to claim 5, wherein the airbag is configured, as the deployment gas is additionally supplied, for the front air chambers other than a contracted front air chamber to br expanded and deformed to fall down in a direction to close the recessed portion, and
   wherein when one of the first air chambers contract upon a collision, the coupling member is configured to pull the front end portions of a remainder of the front air chambers toward the contracted front air chamber.

13. The airbag apparatus according to claim 1, wherein the airbag is configured to have the collision object contained in a recessed portion held by a left and a right front air chambers from among the front air chambers increased in internal pressure, and at a same time, front end portions of the front air chambers are pulled by the coupling member and close an inlet of the recessed portion to restrain the collision object.

14. The airbag apparatus according to claim 1, wherein the airbag is configured to while the collision object is restrained in a recessed portion, and when the collision object is displaced relative to the vehicle body and rearward of the vehicle, the rear air chamber discharges deployment gas through a vent passage and is contracted to absorb collision energy.

15. The airbag apparatus according to claim 2, wherein the vent passage is configured to discharge deployment gas from the rear air chamber when the collision object contacts a recessed portion of the coupling member.

16. The airbag apparatus according to claim 3, wherein the rear air chamber comprises a vent passage configured to discharge deployment gas from the rear air chamber, and
   wherein when one of the first air chambers contract upon a collision, the coupling member is configured to pull the front end portions of a remainder of the front air chambers toward the contracted front air chamber.

17. The airbag apparatus according to claim 3, wherein in the front portion of the airbag, the coupling member is partly recessed rearward of the vehicle so as to form a recessed portion where the collision object is contained and restrained.

18. The airbag apparatus according to claim 3, wherein the coupling member is partly recessed rearward of the vehicle so as to form a recessed portion.

19. The airbag apparatus according to claim 3, wherein the airbag is configured, as the deployment gas is additionally supplied, for the front air chambers other than a contracted front air chamber to be expanded and deformed to fall down in a direction to close a recessed portion.

20. The airbag apparatus according to claim 3, wherein the airbag is configured to have the collision object contained in a recessed portion held by a left and a right front air chambers from among the front air chambers increased in internal pressure, and at a same time, front end portions of the front air chambers are pulled by the coupling member and close an inlet of the recessed portion to restrain the collision object,
   wherein the airbag is configured to while the collision object is restrained in the recessed portion, and when the collision object is displaced relative to the vehicle body and rearward of the vehicle, the rear air chamber discharges deployment gas through a vent passage and is contracted to absorb collision energy.

\* \* \* \* \*